United States Patent
Conaway et al.

[11] Patent Number: 5,109,939
[45] Date of Patent: * May 5, 1992

[54] VIBRATION DAMPENING SUSPENSION DEVICE FOR THE CAB OF A TRUCK VEHICLE

[76] Inventors: Richard Conaway, 2808 Miller Rd., Rte. 1, Shelby, Ohio 44875; Thomas A. McKenzie, 18564 Zuni, Spring Lake, Mich. 49456

[*] Notice: The portion of the term of this patent subsequent to Feb. 5, 2008 has been disclaimed.

[21] Appl. No.: 607,559

[22] Filed: Oct. 31, 1990

Related U.S. Application Data

[63] Continuation-in-part of Ser. No. 385,281, Jul. 25, 1989, Pat. No. 4,989,684.

[51] Int. Cl.$^5$ .................. B62D 33/06; A47C 7/62
[52] U.S. Cl. .................. 180/89.15; 296/190; 403/96
[58] Field of Search ........... 180/89.12, 89.13, 89.14, 180/89.15, 89.16; 280/688, 713, 702, 661; 296/190, 35.1; 403/96, 93, 92

[56] References Cited

U.S. PATENT DOCUMENTS

| | | | |
|---|---|---|---|
| 3,797,883 | 3/1974 | Steiner et al. | 180/89.15 |
| 3,944,017 | 3/1976 | Foster | 296/190 |
| 3,966,009 | 6/1976 | Meacock, II et al. | |
| 4,213,631 | 7/1980 | Wilkerson | 280/661 |
| 4,265,328 | 5/1981 | Rowa et al. | 296/190 |
| 4,275,918 | 6/1981 | Franco | 180/89.12 |
| 4,488,613 | 12/1984 | Marjoram | 180/89.15 |
| 4,513,845 | 4/1985 | Stephens et al. | 180/89.15 |
| 4,650,208 | 3/1987 | Mason | 280/661 |
| 4,807,713 | 2/1989 | Smith et al. | 180/89.14 |
| 4,854,603 | 8/1989 | Scaduto | 280/661 |
| 4,871,189 | 10/1989 | Van Breemen | 180/89.12 |

FOREIGN PATENT DOCUMENTS

| | | |
|---|---|---|
| 1264345 | 1/1990 | Canada . |
| 2027650 | 2/1980 | United Kingdom . |

*Primary Examiner*—Charles A. Marmor
*Assistant Examiner*—Paul Dickson
*Attorney, Agent, or Firm*—Frederick Gotha

[57] ABSTRACT

An improved vibration dampening and shock absorber suspension device for the cab of a truck vehicle is set forth having a base member adapted for mounting to the truck frame and an impact plate adapted for attachment to the truck cab where the impact plate has a lateral dimension which is less than the lateral distance between the side beams of the truck frame. Interposed between the base member and the impact plate is a pair of air springs which are maintained at a constant height by a height control valve. A pair of hydraulic shock absorbers are pivotally connected to both the impact plate and base member where the central axis of the shock absorbers form the opposite sides of a trapezoid.

In another embodiment of the invention a suspension device is set forth having a base member adapted for attachment to a support body and a pair of air springs intermediate the base member and an impact plate. The displacement axis of the air springs are oppositely inclined to the vertical axis of the base member forming the opposite sides of a trapezoid. A hydraulic shock absorber is pivotally connected to the impact plate and base member such that the inclination of the central axis of the shock absorber with the vertical axis of the base member may be selectively changed.

10 Claims, 6 Drawing Sheets

VIBRATION DAMPENING SUSPENSION DEVICE FOR THE CAB OF A TRUCK VEHICLE

This is a continuation-in-part of application Serial No. 07/385,281 filed Jul. 25, 1989, Pat No. 4,989,684.

FIELD OF THE INVENTION

This invention relates to a suspension device for isolating a suspended body from the forced vibrations of a support body and more particularly to a suspension device for the cab of a truck vehicle to dampen the vibration and shock experienced by the truck vehicle thereby enhancing driver comfort and reducing driver fatigue.

BACKGROUND OF THE INVENTION

To provide comfort for truck drivers and reduce driving fatigue experienced by operators of truck vehicles, it is desirable to suspend the operator's cab by utilizing a vibration isolation and shock absorption device intermediate the truck chassis and cab which reduces the shock, vibration and consequent pounding the driver experiences during the operation of the vehicle. Additionally, the continued application of vibration and shock forces to the cab results in structural damage which ultimately results in increased maintenance costs.

The load carried by a truck vehicle is supported by the frame which is resiliently carried by suspension springs and supported by the truck wheels. Suspension springs have a high rate of stiffness which makes the ride more jarring on the operator of the vehicle. To dampen the vibration and shock transmitted to the cab, suspension systems have been employed utilizing conventional hydraulic automotive shock absorbers and air springs to reduce jounce and rebound movement of the cab with respect to the truck frame. Typically in the prior art, the air springs and shock absorbers were connected directly to the longitudinal side beam members of the truck frame such that the forces transmitted to the cab were at points remotely located from the cab center of gravity and consequently resulted in substantial rolling movements and cab sway. For example, in U.S. Pat. No. 3,944,017, issued Mar. 16, 1976, a suspension device for a truck cab is disclosed where air springs are used which have a relatively low spring rate to isolate the jounce and vibration of the truck frame from the cab. Shock absorbers are also utilized which contain internal jounce and rebound bumpers that limit the extent of vertical movement of the cab with respect to the truck frame. The air springs are shown to be oppositely mounted immediately above the truck frame and located in direct vertical alignment with the frame. The shock absorbers are also oppositely mounted but with central axis extending in an outward direction from the vertical axis of the frame member where the central axes of the shock absorbers are inclined to the displacement axes of the air springs. Thus, in U.S. Pat. No. 3,944,017, and similarly in the prior art, those forces transmitted to the cab by the air springs and shock absorbers are at a substantial distance from the center of gravity of the cab thereby causing increased shock, lateral sway and rolling. Consequently, the driver experiences greater discomfort and the cab itself sustains higher force load levels which ultimately results in structural failure.

SUMMARY OF THE INVENTION

There is, therefore, provided according to the present invention, an improved vibration dampening suspension device for truck vehicle cabs which substantially reduces vibration and shock forces experienced by the truck driver. The improved device not only reduces driver fatigue but also minimizes the structural damage to the truck cab. Although the present invention has been described in embodiments which are directed for use with a truck cab, the invention may be utilized to isolate a suspended body other than a truck cab from the forced vibrations of a support body.

The present invention is directed to an improved vibration dampening suspension device composed of a base member which is a rigid body and is adapted for fitting to the frame of the truck vehicle. The base member is symetrical about a reference axis. A pair of hydraulic shock absorbers preferably of 1 3/16 inch bore are oppositely mounted to the base member and laterally and equally spaced from the reference axis. The central axes of the shock absorbers are inclined inwardly toward the reference axis so as to form the opposite sides of a trapezoid. The shock absorbers used in the present invention are sold under the trademark "Gabriel" and are manufactured by Gabriel Shock, a division of Marymont Corporation.

The invention further incorporates an impact plate which is a rigid body adapted for attachment to the cab of the truck vehicle where the impact plate is axially spaced from and substantially parallel to the base member. The lateral dimension of the impact plate is less than the lateral distance between the side beams of the truck frame. Vibration and shock forces experienced by the truck frame are transmitted to the cab through the impact plate. One end of each of the shock absorbers is pivotally mounted to the impact plate such that the lateral distance between the shock absorber pivot on the impact plate is less than the lateral distance between the shock absorber pivot points on the base member.

A pair of air springs, identified by the trademark "Super-Cushion", Part Number IS5, manufactured by Goodyear Tire and Rubber Company, are located intermediate the base member and impact plate where the air springs have a displacement axis which is substantially parallel to the reference axis of the base plate. A zero delay height control valve is mounted to the base member for maintaining the air springs at a pre-selected height, preferably 6.5 inches. The shock absorbers and air springs are located substantially inboard of the truck frame and are symetrically disposed about the reference axis of the base member. Although not normally in contact with the impact plate, a pair of rubber snubbers are symetrically located on the base plate which limit the vertical displacement of the impact plate if failure occurs in the air spring system or during excessive compressive loading. Thus, the moments of the shock and vibration forces transmitted through the impact plate about the center of gravity of the truck cab are substantially reduced which results in greater driver comfort and less structural stress on the cab.

In another embodiment of the invention, one air spring is utilized where the displacement axis of the air spring substantially coincides with the reference axis of the base member.

In yet another embodiment of the invention, the invention is directed toward a vibration dampening suspension device for isolating a suspended body from the forced vibrations of a support body. In this embodiment, the displacement axes of the air springs are inclined to the vertical in a trapezoidal configuration and a hydraulic shock absorber interconnects the impact plate and base member such that the central axis of the shock absorber may be varied with the vertical to selectively dampen vertical vibration. Specifically, a base member having a vertical axis is adapted for mounting to a support body such as a vehicle frame. A pair of air springs having displacement axes are symmetrically mounted to the base member and the displacement axes of the air springs are oppositely inclined to the vertical axis of the base member forming an acute angle when axially extended in the direction of the suspended body. The upper ends of the air springs are mounted to an impact plate which is adapted for attachment to the suspended body. The shock absorber has a first end and a second end and a central axis and is pivotally mounted to the impact plate. The pivot axis of the first end of the shock absorber is in a fixed and established relationship with the impact plate. To allow for adjustable vertical dampening, the second end of the shock absorber is pivotally connected to an adjustment plate which in turn is pivotally carried by the base member such that the angle of inclination of the central axis of the shock absorber with the vertical axis of the base member may be selectively changed thereby selectively controlling vertical dampening of vibrations.

In another and further embodiment of the invention, a linking member or lever is utilized in combination with an air spring and shock absorber to isolate the suspended body from the forced vibrations of the support body. In this embodiment, the linking member has a first pivot axis and is pivotally mounted at the first pivot axis to the base member where the first pivot axis is in a fixed and established relationship to the base member. The linking member also has a second pivot axis which is laterally spaced from the first pivot axis. This permits a pivotal mounting of the impact plate to the linking member at the second pivot axis. The shock absorber is pivotally mounted to the impact plate at one end while the other end is pivotally connected to an adjustment plate which in turn is pivotally mounted to the base member such that the angle of inclination of the central axis of the shock absorber with the vertical axis of the base member may be selectively changed. By utilizing the air spring intermediate the first and second pivot axes, it has been found that the natural frequency of the device is lowered as the spring approaches the first pivot axis. More specifically, the air spring having a displacement axis is mounted to the base member and to the linking member where the displacement axis of the air spring is substantially parallel to the vertical axis of the base member and located intermediate the first and second pivot axes of the linking member. By utilizing the linking member or lever, for the same suspended body or cab load, the equivalent spring rate for the air spring is reduced as the displacement axis approaches the first pivot axis which lowers the natural frequency of vibration for the suspension device. The orientation of the hydraulic shock absorber may be adjusted to obtain optimum vibration isolation for a particular truck or support body configuration and is provided with adequate stroke to ensure that it will not encounter the internal extension or compression limits of the stroke during its operation.

The linking member also serves to locate the lateral position of the cab structure, not allowing undue lateral motion as the cab is subjected to lateral forces encountered during turning or cornering.

As can be appreciated, the suspension device according to the present invention is inexpensive to manufacture, reduces the maintenance required on the cab by substantially reducing the shock, vibration and pounding associated with the operation of a truck, and substantially reduces the physical problems associated with the vibration and shock forces a driver ordinarily experiences when operating a truck. The simple construction of the suspension device permits adaptation to different types of truck vehicles and cab configurations.

BRIEF DESCRIPTION OF THE DRAWINGS

These and other features and advantages will become appreciated as the same become better understood with reference to the following specification, claims and drawings wherein:

DETAILED DESCRIPTION

Figure 1:
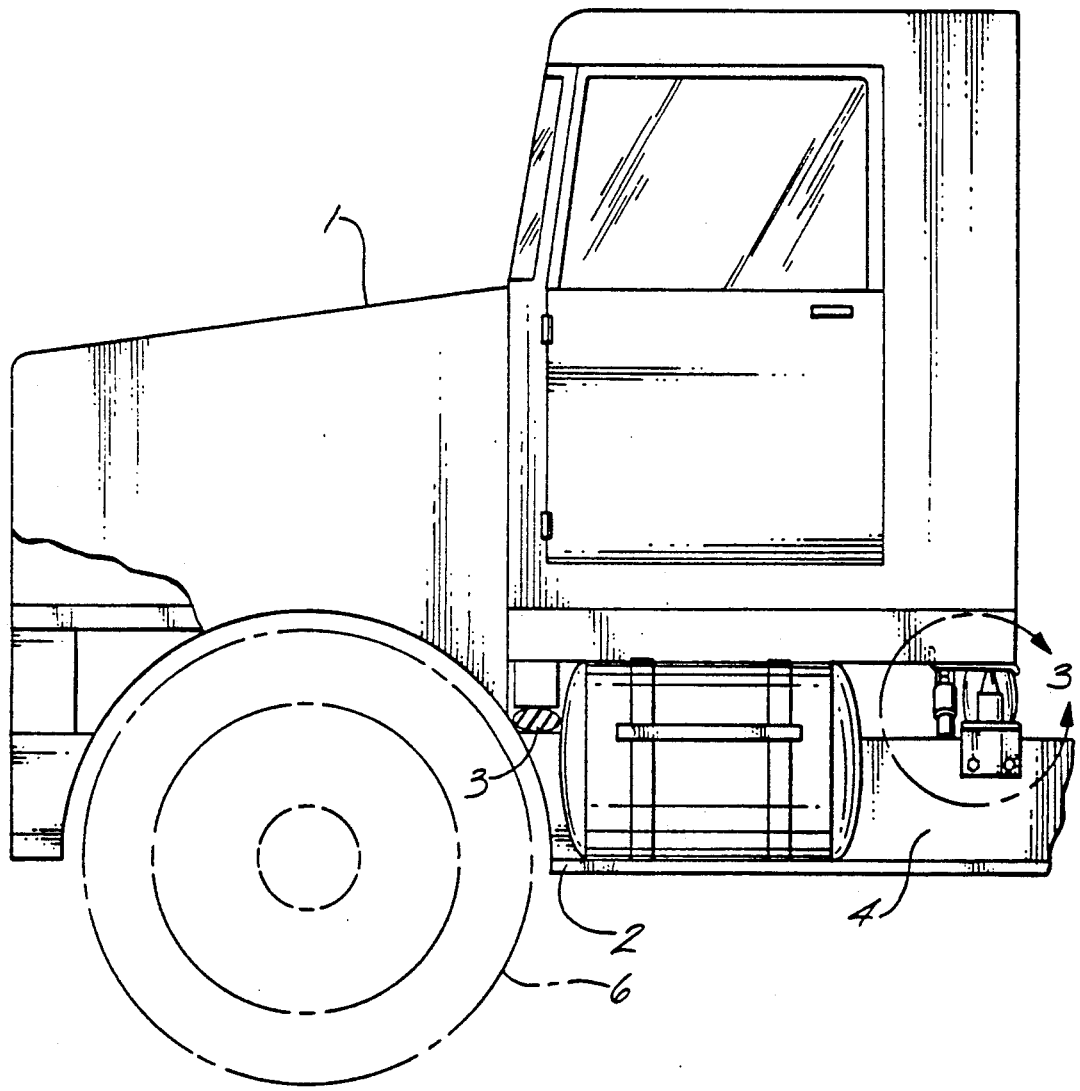
FIG. 1 is a side illustration of the truck vehicle and suspended cab according to the present invention.

Referring to FIG. 1, a side view is shown of the truck cab 1 mounted to the truck frame 2. There are numerous methods for mounting the forward portion of a truck cab to the frame. For the purpose of illustrating the present invention, the forward portion of the cab 1 is connected to the frame 2 by interposing between the cab and the frame an elastomeric or rubber donut 3 which serves to dampen the vibration and shock transmitted to the cab. The rubber donut 3 or mount secures the forward structure of the cab to the truck frame 2 by utilizing a mount design which provides some dampening of vibration transmitted from the frame to the cab. It also provides rotational flexibility allowing the cab structure to pivotally rotate about the rubber donut thereby allowing the cab isolation to function uninhibitedly. The connection of the forward portion of the truck cab to the truck frame 2 utilizes standard fastening methods which are common in the trucking industry. The rear of cab 1 is suspended from the truck frame 2 by an improved suspension system which is more particularly described in FIG. 2.

Figure 2:
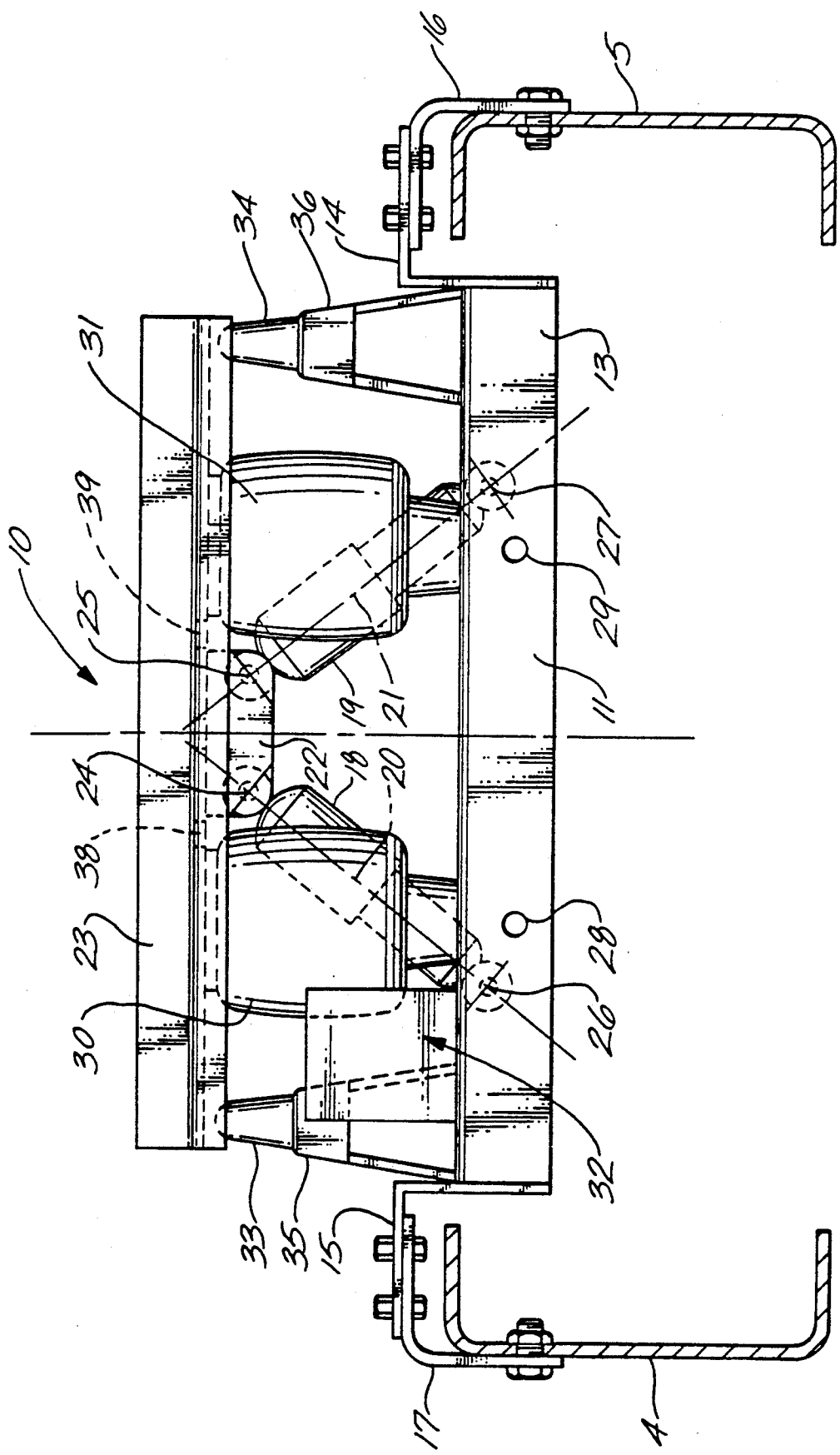
FIG. 2 is a rear view of the present invention with the truck chassis shown in cross-section.

As shown in FIG. 2, which is a rear view of the assembly of the cab suspension system 10, a base member 11 has a reference axis 12 about which cab suspension assembly 10 is symetrical. Base member 11 is bolted by conventional means to side beam 4 and side beam 5 of the truck frame 2. Base member 11 is comprised of a channel beam 13 extending laterally from reference axis 12 where the ends of the channel beam are rigidly welded to angle brackets 14 and 15 which in turn are bolted to rear cab bracket mounts 16 and 17. In the disclosed embodiment of the invention, rear cab bracket mounts 16 and 17 are bolted to the truck frame. Thus, base member 11 forms a rigid platform interconnecting side beam 4 and side beam 5 of the truck frame 2 such that the shock and vibration forces experienced by the truck frame are transmitted directly to base member 11.

Pivotally mounted to base member 11 are the first ends of hydraulic shock absorbers 18 and 19 which have, in the preferred embodiment of the invention respectively, central axis 20 and 21. The shock absorbers are identified by the trademark "Gabriel" and are manufactured by Gabriel Shock, a division of Marymont Corporation, and are of 1 3/16 inch bore for use with cab suspension systems. Hydraulic shock absorbers having bore sizes ranging from 1 inch to 1½ inches may also be utilized in the present invention. Preferably shock absorbers 18 and 19 are of the type which dampen sixty percent of the velocity of vibration when the shock absorber is subject to tensile loading along the central axis and forty percent of velocity when loaded compressively along the central axis. The second ends of shock absorbers 18 and 19 are pivotally mounted to U-shaped channel member 22 which is welded to impact plate 23. The lateral distance between the pivot points 24 and 25 of the second ends of shock absorbers 18 and 19 is less than the lateral distance between the pivot points 26 and 27 of the first ends of shock absorbers 18 and 19. Thus, the lateral distances between pivot points 24 and 25 and pivot points 26 and 27 form the opposite sides of a trapezoid with the central axes 20 and 21 of the shock absorbers forming the opposite sides of the trapezoid.

To accommodate different truck frame configurations, base member may have a plurality of adjustment aperatures. In the present invention, aperatures 28 and 29 permit the angle between the reference axis and the central axis of the shock absorbers to be decreased. For example, where the truck frame is made of aluminum and assuming identical forces acting on the truck frame, the amplitude of vibration in the vertical direction may be greater than the amplitude for a truck frame made of steel. To accommodate for these differing frame configurations the base member 11 as shown in FIG. 2 has additional aperatures 28 and 29 to permit the first end of shock absorbers 18 and 19 to be pivotally mounted at these aperatures so as to decrease the angle of the central axis of the shock absorbers with the reference axes of the base member thereby permitting the shock absorbers to more efficiently dampen vertical vibration of the truck frame. Additional aperatures located on the base member along the arc generated by a radius length equal to the distance between opposing pivot points of the shock absorbers, not shown, may also be used to increase the angle of the central axes of the shock absorbers with the reference axis to more efficiently dampen the lateral or horizonal vibration components.

Interposed between impact plate 23 and base member 11 are a pair of air springs 30 and 31 which in the preferred embodiment of the invention are manufactured by Goodyear Tire and Rubber Company and identified by the trademark "Super-Cushion", Part Number IS5, air springs. A height control valve 32 is mounted to base member for maintaining the air springs at a constant height of 6.5 inches regardless of the vertical forces experienced by the suspension system 10. Although not shown, the height control valve incorporates a control rod which is mounted to the impact plate and detects height changes of the air springs. These height changes are relayed to the height control valve 32 which either admits or exhausts air in order to maintain a constant height of 6.5 inches. The air springs used in the present invention may be set to operate between pre-selected heights of 6.2 inches to 7.2 inches. Any standard height control valve having a zero delay may be utilized with the air springs. The height control valve 32 which is preferred in the practice of the present invention is manufactured by Nelson Metal Products Corporation and may be utilized with any type of air spring. U.S. Pat. No. 3,635,460 describes the structure and operation of the height control valve and is incorporated herein by reference.

In another embodiment of the invention, not shown, one air springs may be utilized where the displacement axis of the air springs substantially coincides with the reference axis 12 of the base member 11. The height control valve in this embodiment also maintains the air spring at a pre-selected height.

The vertical displacement of the impact plate 23 is limited by rubber snubbers 33 and 34 which are mounted to snubber towers 35 an 36. Snubbers 33 and 34 are preferably made of rubber but may be made of other materials provided such materials have elastromeric properties. Snubber towers 35 and 36 are rigid bodies which are fixed to channel beam 13 of the base member 11.

Figure 3:
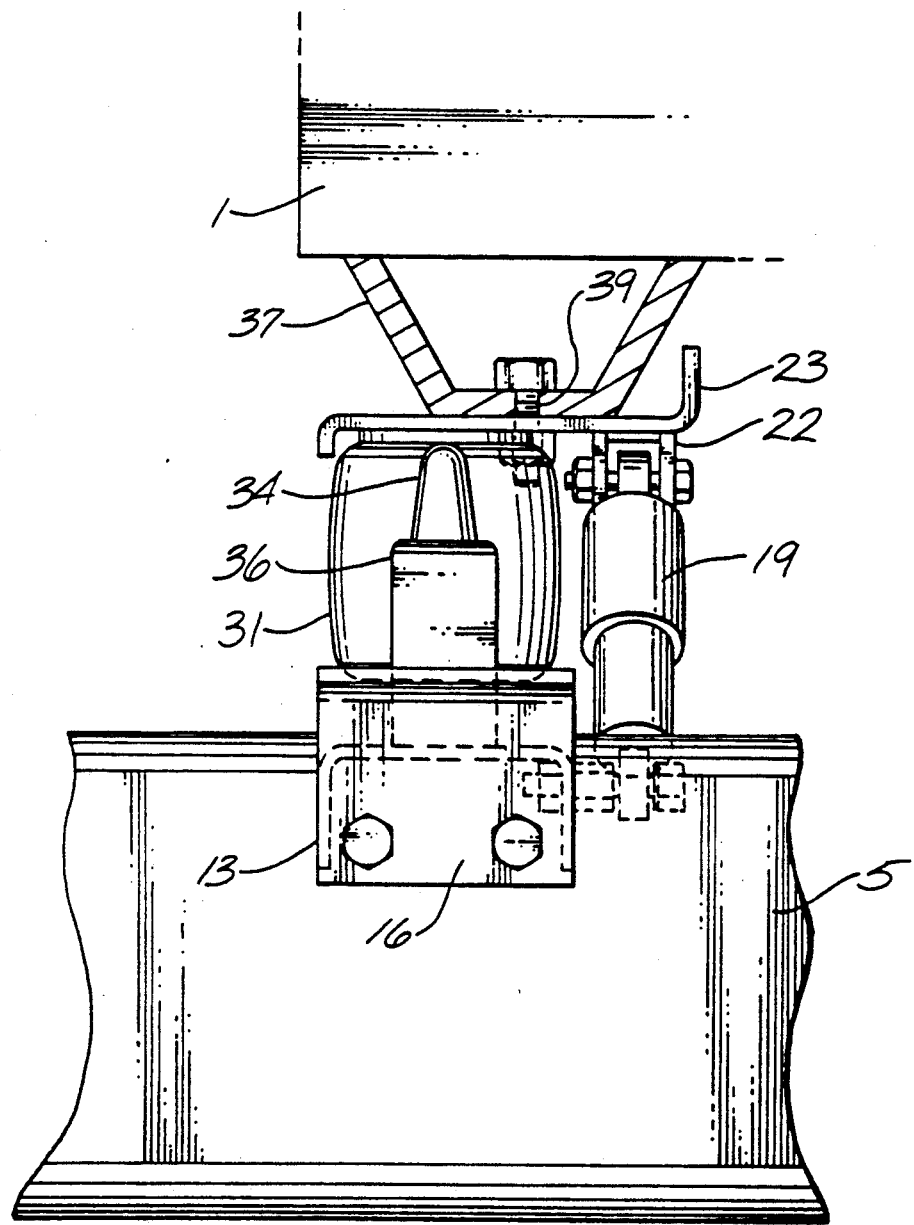
FIG. 3 is an expanded side view of the present invention as depicted in FIG. 1.

Referring now to FIG. 3 a typical connection of the cab I to impact member 23 is illustrated. As can be seen, a V-shaped channel member 37 supports the base of truck cab 1 and is bolted to impact plate 23 through holes 38 and 39 contained in the impact plate.

In operation, the passage of truck wheels 5 over a highway will cause the transmission of shock and vibration forces from the truck frame 2 to the base member Located laterally inward from the side beams 4 and 5 of the truck frame are hydraulic shock absorbers 18 and 19 which have central axis inclined to the reference axis 12 of the base member 11. The ends of the shock absorbers are pivotally mounted to the base member 11 and the impact plate 23. The lateral distance between the pivot points 24 and 25 located on the impact plate is less than the lateral distance between pivot points 26 and 27 on the base member. Thus, the central axis of the shock absorbers form the opposite sides of a trapezoid with the distance between pivot points 26 and 27 forming the base of the trapezoid. The resultant forces transmitted to the truck cab by the shock absorbers is directed inwardly in the direction of the center of gravity of the cab which minimizes the sway and rolling of the cab. Acting in conjunction with the shock absorbers, a pair of air springs 30 and 31 also located laterally inward from the side beams of the truck frame dampen the vertical vibration transmitted by the frame to the cab. The forces therefore creating rolling action about the center of gravity of the cab act through shortened moments arms and therefore the rolling moments are reduced. The suspension system may be modified to accommodate different frame configurations by adjusting the pivot points at aperatures 28 and 29 of the base member 11. The adjustment permits more efficient dampening of the vertical amplitudes of the truck frame vibration and shock loads.

In the embodiment of the invention utilizing one air spring, the displacement axis of the air spring substantially coincides with the reference axis of the base member and the forces transmitted to the cab by the spring act through a limited lateral distance from the center of gravity of the truck cab. Thus, the sway of the cab is essentially reduced by the forces transmitted through the air spring and the shock absorbers acting through reduced moment arms about the center of gravity of the cab.

Figure 5:
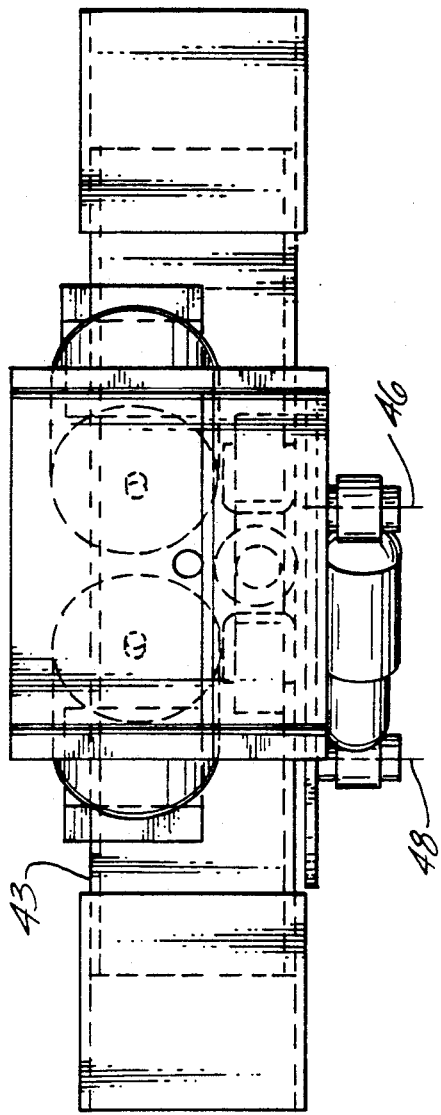
FIG. 5 is a top view of FIG. 4.
Figure 4:
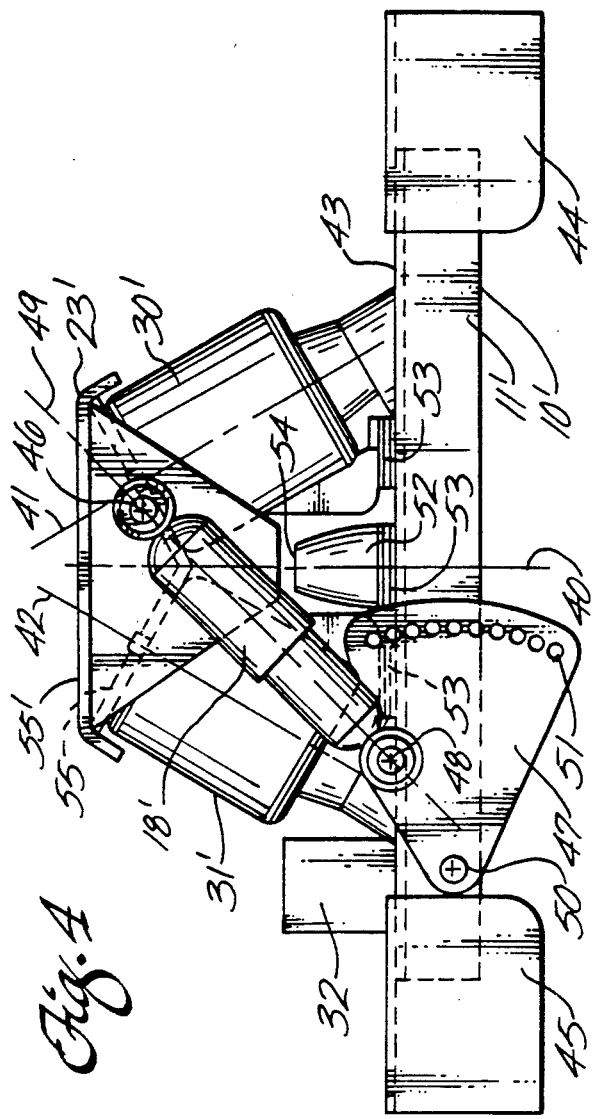
FIG. 4 is a rear view of an embodiment of the present invention which incorporates a pair of air springs trapazoidally mounted and a hydraulic shock absorber to dampen vertical and lateral vibration.
Figure 6:
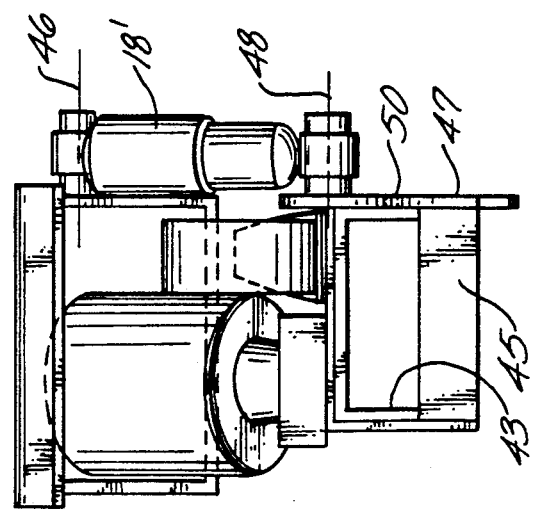
FIG. 6 is a side view of the embodiment of the invention depicted in FIG. 4.

Referring to FIGS. 4, 5 and 6, an embodiment of a suspension device is illustrated in which the air springs are inclined to the vertical and a hydraulic shock absorber is utilized to selectively dampen vertical vibration. In this embodiment, identified as suspension device 10, in FIG. 4, the air springs 30' and 31' are oppositely mounted to base member 11' and symetrically to vertical axis 40 of base member 11'. Displacement axes 41 and 42 of the air springs respectively, are oppositely inclined to vertical axis 40 such that an intersection of the axial extensions of the displacement axes occurs in the region of the suspended body or truck cab which is attached to and supported by impact plate 23'.

Impact plate 23' contains a trough member 55 which is shown in FIG. 4 to which the upper ends of air springs 30' and 31' are attached. Trough member 55 is securely attached to support member 55, by welding or other fastening means.

Base member 11' is a rigid body having a channel beam 43 which is welded to mounting brackets 44 and 45. In mounting the suspension device to a support body or truck frame mounting brackets 44 and 45 are rigidly attached by welding or other fastening means to the support body which, for example, could be the side beams of a truck frame (as illustrated in FIG. 2).

As further illustrated in FIG. 4, to achieve selective vertical dampening of the suspension device, hydraulic shock absorber 18' has a first end which is pivotally mounted to impact plate 23' at first pivot axis 46 which is in fixed and established relationship to impact plate 23'. The opposing end of hydraulic shock absorber 18' is pivotally mounted to adjustment plate 47 at second pivot axis 48 where second pivot axis 48 is in fixed and established relationship to adjustment plate 47. First pivot axis 46 is preferably located so as to be in approximate vertical alignment with the center of gravity of the suspended body and laterally intermediate the upper ends of air springs 30' and 31' which form the upper edge of the trapezoid with opposing sides defined by the displacement axes of the air springs. Central axis 49 of shock absorber 18' may therefore be selectively inclined with vertical axis 40 of the base member 11' by positioning adjustment plate 47 which is also pivotally mounted to base member 11' at pivot point 50. As can be seen in FIG. 4, adjustment plate 47 has a plurality of aperatures 51 for permitting a fastening member such as a bolt to be selectively extended into any one of aperatures 51 whereby the angle of inclination of central axis 49 of shock absorber 18' may be selectively adjusted with the vertical. Thus, the vertical amplitude of vibration of impact plate 23 is selectively controllable by varying the angle of inclination of the central axis of shock absorber 18' with vertical axis 40 through adjustment of adjustment plate 47.

By mounting air springs 30' and 31' such that their displacement axes are inclined to the vertical, the eqivalent spring constant for the suspension device has been found to be lower than the spring constant for the air springs when their displacement axes are vertical. Thus, by inclining the displacement axes of the air springs to the vertical, the natural frequency of the suspension device is reduced relative to the natural frequency of the suspension device where the air spring displacement axes are vertical. The frequency ratio therefore of the forced vibration of the support body to the suspended body becomes larger as the acute angle of inclination formed by the intersection of the displacement axes of the air springs with the vertical axis of the base member increases. For the same weight of suspended body, by selectively inclining the displacement axes of the air springs with the vertical, the magnification of the forced vibrations is reduced. By adjusting the central axes 49 of shock absorber 18' with the vertical axis of base member 11', the vibration of the suspended body may be selectively dampened in the vertical and lateral directions.

Although not shown in the drawings, one air spring may be utilized which has a displacement axis inclined to the vertical axis of base member 11'. In this configuration, the central axis of the shock absorber and the displacement axis of the air spring are preferably oppositely inclined for greater structural strength of the suspension device. The inclination of the displacement axis of the air spring with the vertical axis reduces the equivalent spring constant of the suspension device relative to the condition where the air spring displacement axis is parallel to the vertical axis. It has been found that by inclining the air spring to the vertical, the natural frequency of the air spring and consequently the suspension device is reduced which reduces the magnification factor of the forced vibrations.

A restraining structure is utilized in the invention embodiment disclosed in FIG. 4 to control jounce and rebound forces which may occur when extreme amplitudes of motion are encountered by impact plate 23'. A lower jounce 52 will provide support for the suspended body or truck cab in the event of loss of the air spring function which may result from pneumatic leakage from the air springs or a malfunction occurring in the height control valve 32. An upper rebound bumper is also provided which engages the restraining structure at plate 65 during extreme amplitudes of motion which may result from the system approaching a resonant condition. Similarly, jounce bumper 52 will engage plate 65 for extreme amplitudes in the opposite direction. By the use of shims 53 the restraining structure may be selectively positioned relative to the base member 11' to adjust the clearance gap 54 between the jounce and rebound bumpers.

Figure 7:
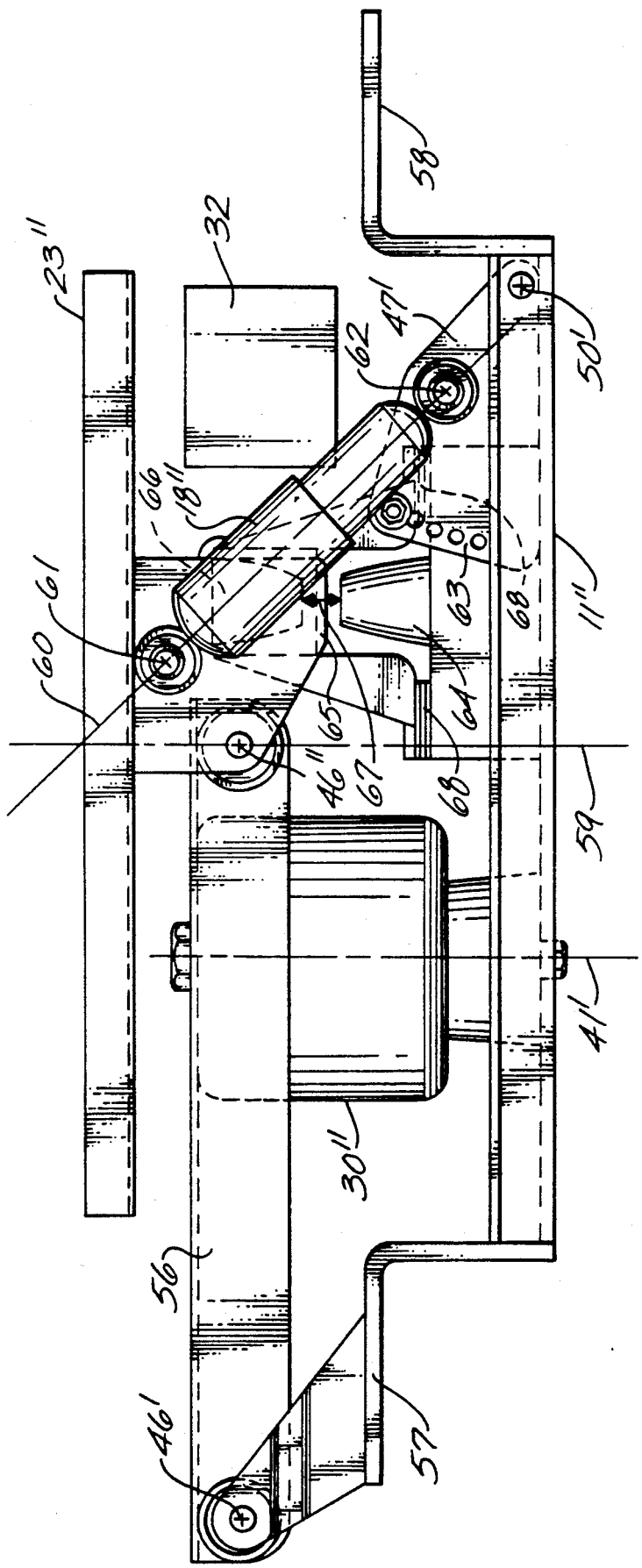
FIG. 7 is a rear view of yet another embodiment of the invention illustrating a suspension device utilizing a linking arm and an air spring in combination with a hydraulic shock absorber.
Figure 8:
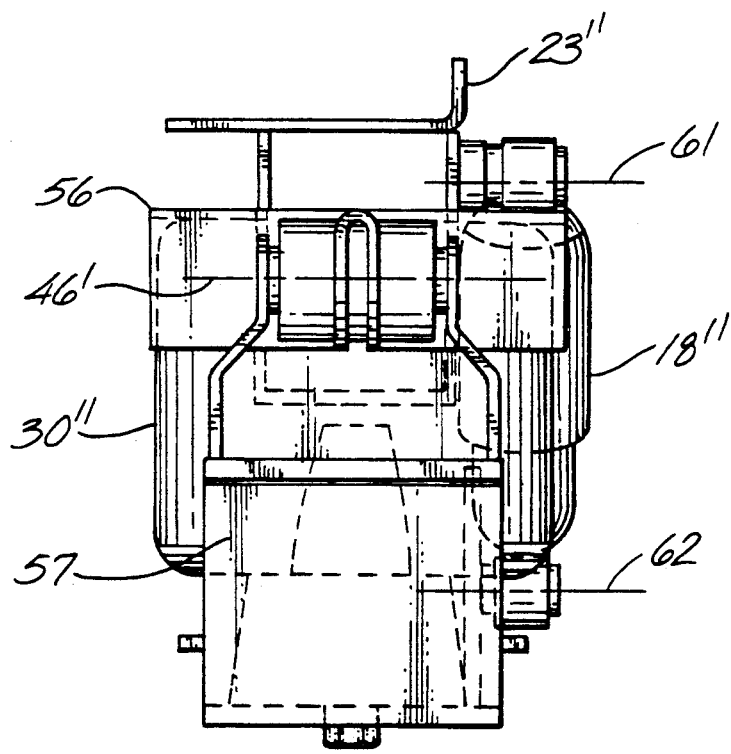
FIG. 8 is a side view of the embodiment depicted in FIG. 7.

Referring now to FIGS. 7 and 8, yet another embodiment of the invention is presented. In this embodiment of the invention, a linking arm or lever 56 is pivotally mounted at pivot axis 46' to the base member 11" which in turn is fixed to a support body such as the side beams of the truck frame at mounting brackets 57 and 58 of base member 11". Pivot axis 46' is in fixed and established relationship to the base member 11". Linking arm 56 is also pivotally mounted at pivot axis 46" to impact plate 23" which may be attached to a suspended body such as the truck cab illustrated in FIG. 2.

Referring again to FIG. 7, it can be seen that air spring 30" having a displacement axes 41' is located intermediate pivot axis 46' and 46" Displacement axes 41' of the air spring is substantially parallel to vertical axis 59 of base member 11" and position intermediate the ends of linking arm 56. In operation, air spring 30", therefore, must generate forces larger than those required to support the suspended body which results in a major improvement in isolating the vibration of the suspended body from the support body. As the displacement axis of the spring is moved in the direction of pivot point 46′, the equivalent spring rate of the suspension device decreases which results in a decrease of the natural frequency of the suspension device.

To optimize vibration isolation of the suspended device, a shock absorber 18″ having a central axis 60 is pivotally mounted to impact plate 23″ at a first pivot axis 61 which is in fixed and established relationship to impact plate 23″. It is preferable to fix the location of first pivot axis 61 in near vertical alignment with the center of gravity of the suspended body. However, the location of the center of gravity will depend upon the design of the suspended body and the adjustable feature of the shock absorber anticipates variations in design. Also, first pivot axis 61 is located laterally from pivot axis 46″ in the opposite direction of displacement axis 41′. The second end of shock absorber 18, is pivotally mounted to adjustment plate 47′ at the second pivot axis 62. The angle of inclination of the central axis of shock absorber 18″ with vertical axis 59 is selectively adjustable by rotating adjustment plate 47′ about pivot point 50′. As can be seen from FIG. 7, adjustment plate 47′ has a plurality of aperatures 63 where any one of said aperatures may be selected for fixing the angle of inclination between the central axis of the shock absorber and the vertical axis of base member 11″. Thus, the vertical damping of the suspension device may be selectively adjusted to optimize the vibration isolation of the suspended body.

A restraining structure of the type illustrated in FIG. 4 is also utilized in the linking arm and air spring suspension device presented in FIG. 7. In the same manner, upper and lower jounce and rebound bumpers provide for jounce and rebound control in the event large amplitudes of vibration are encountered when, for example, the system approaches resonance. These bumpers may be made of a rubber or elastomeric material. As illustrated in FIG. 7, jounce bumper 64 will prevent further vertical movement of impact plate 23″ by engaging the restraining structure at plate 65 and rebound bumper 66 which is carried by base member 11″ will engage plate 65 in the event of excessive vertical movement in the direction of the rebound bumper. The clearance gap 67 between the jounce and rebound bumpers is adjustable by removing or adding shims 68.

In the linking arm and air spring embodiment of the suspension device as illustrated in FIG. 7, by utilizing the linking arm to increase the force acting on the air spring, the natural frequency of the suspension device is therefore reduced which reduces the magnification of the forced vibrations acting through the support body. Thus, by selectively controlling the vertical damping of the shock absorber, the suspended body or cab of the truck is more effectively isolated from the forced vibrations of the support body.

While I have shown a preferred embodiment of the present invention, it is to be understood that it is subject to many modifications without departing from the scope and spirit of the claims as recited herein.

What is claimed is:

1. An improved vibration dampening suspension device for isolating a suspended body from the forced vibrations of a support body comprising:
   a) a base member having a vertical axis, and adapted for mounting to said support body;
   b) a pair of air springs having a displacement axis and a lower and upper end where said lower ends are oppositely and symmetrically mounted to said base member;
   c) an impact plate adapted for attachment to said suspended body and mounted to said air springs at said upper ends of said air springs, said impact plate having a first pivot axis in fixed and established relationship to said impact plate;
   d) a hydraulic shock absorber having a central axis and a first and second end where said first end is pivotally mounted at said first pivot axis to said impact plate for rotation relative to said first pivot axis;
   e) adjustment means connected to said second end of said shock absorber and carried by said base member for selectively changing the angle of inclination of said central axis with said vertical axis such that the vibration of said suspension device may be selectively dampened; and
   f) a height control valve associated with said air springs for maintaining said air springs at a constant preselected height.

2. The improved vibration dampening suspension device recited in claim 1 wherein said displacement axes of said air springs are oppositely inclined to said vertical axis such that the lateral distance between said upper ends of said air springs is less than the lateral distance between said lower ends of said air springs.

3. The improved vibration dampening suspension device recited in claim 1 wherein said adjustment means further comprises an adjustment plate pivotally mounted to said base member and where said second end of said shock absorber is pivotally mounted to said adjustment plate.

4. An improved vibration dampening suspension device recited in claim 2 wherein said adjustment means further comprises an adjustment plate pivotally mounted to said base member and where said second end of said shock absorber is pivotally mounted to said adjustment plate.

5. An improved vibration dampening suspension device for isolating a suspended body from the forced vibrations of a support body comprising:
   a) a base member having a vertical axis and adapted for mounting to said support body;
   b) a pair of air springs having displacement axes and a lower and upper end where said lower ends of said air springs are oppositely and symmetrically mounted to said base member and said displacement axes are substantially parallel to said vertical axes;
   c) an impact plate adapted for attachment to said suspended body and mounted to said air springs at said upper ends, said impact plate having a first pivot axis in fixed and established relationship to said impact plate;
   d) a shock absorber having a central axis and a first end and a second end where said first end is pivotally mounted at said first pivot axis to said impact plate for rotation relative to said first pivot axis and said second end of said shock absorber is pivotally mounted in a fixed and established relationship to said base member; and
   e) a height control valve associated with said air springs for maintaining said air springs at a constant pre-selected height.

6. The improved vibration dampening suspension device recited in claim 5 wherein said displacement axes of said air springs are oppositely inclined to said vertical axis such that the lateral distance between said upper ends of said air springs is less than the lateral distance between said lower ends of said air springs.

7. An improved vibration dampening suspension device for isolating a suspended body from the forced vibrations of a support body comprising:
   a) a base member having a vertical axis and adapted for mounting to said support body;
   b) a linking member having a first pivot axis and so constructed and adapted for pivotal mounting at said first pivot axis to said base member where said first pivot axis is in fixed and established relationship to said base member, said linking member having a second pivot axis laterally spaced from said first pivot axis;
   c) an impact plate adapted for attachment to said suspended body pivotally mounted to said linking member at said second pivot axis;
   d) a shock absorber having a central axis and a first and second end, where said first end is pivotally mounted to said impact plate;
   e) adjustment means connected to said second end of said shock absorber and carried by said base member for selectively changing the angle of inclination of said central axis with said vertical axis;
   f) an air spring having a displacement axis mounted to said base member and to said linking member where said displacement axis is substantially parallel to said vertical axis and said displacement axis is located intermediate said first and second pivot axes of said linking member;
   g) a height control valve associated with said air spring for maintaining said air spring at a constant pre-selected height.

8. The improved vibration dampening suspension device recited in claim 7 wherein said adjustment means further comprises an adjustment plate pivotally mounted to said base member and where said second end of said shock absorber is pivotally mounted to said adjustment plate.

9. An improved vibration dampening suspension device for isolating a suspended body from the forced vibrations of a support body comprising:
   a) a base member having a vertical axis and adapted for mounting to said support body;
   b) a linking member having a first pivot axis and so constructed and adapted for pivotal mounting at said first pivot axis to said base member where said first pivot axis is in fixed and established relationship to said base member, said linking member having a second pivot axis laterally spaced from said first pivot axis;
   c) an impact plate adapted for attachment to said suspended body pivotally mounted to said linking member at said second pivot axis;
   d) a shock absorber having a central axis and a first and second end where said first end is pivotally mounted to said impact plate and said second end is pivotally mounted to said base member such that said central axis of said shock absorber is inclined to said vertical axis and said first end of said shock absorber is radially spaced from said second pivot axis of said linking member;
   e) an air spring having a displacement axis mounted to said base member and to said linking member where said displacement axis is substantially parallel to said vertical axis and said displacement axis is located intermediate said first and second pivot axes of said linking member; and
   f) a height control valve associated with said air spring for maintaining said air spring at a constant preselected, height.

10. An improved vibration dampening suspension device for isolating a suspended body from the forced vibrations of a support body comprising:
    a) a base member having a vertical axis and adapted for mounting to said support body;
    b) an air spring having a displacement axis and a lower and upper end where said lower end is mounted to said base member and said displacement axis is inclined to said vertical axis;
    c) an impact plate so constructed and adapted for attachment to said suspended body and mounted to said upper end of said air spring, said impact plate having a first pivot axis in fixed and established relationship to said impact plate;
    d) a hydraulic shock absorber having a central axis and a first and second end where said first end is pivotally mounted at same first pivot axis to said impact plate for rotation relative to said first pivot axis;
    e) adjustment means connected to said second end of said shock absorber and carried by said base member for selectively changing the angle of inclination of said central axis with said vertical axis such that the vibration of said suspension device may be selectively dampened, and
    f) a height control valve associated with said air spring for maintaining said air spring at a constant pre-selected height.

* * * * *